Figure 2:
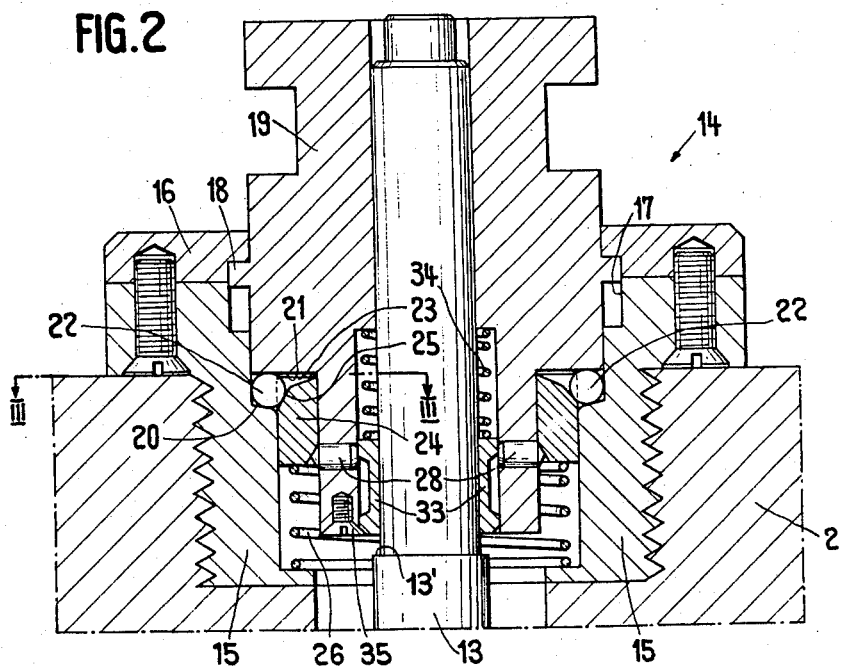

Feb. 7, 1961 R. CHEVALLIER 2,970,503
PUNCH TOOL DRIVE MEANS YIELDABLE UPON UNDUE
THICKNESS OF MATERIAL BEING PUNCHED
Filed Feb. 26, 1957 2 Sheets-Sheet 1
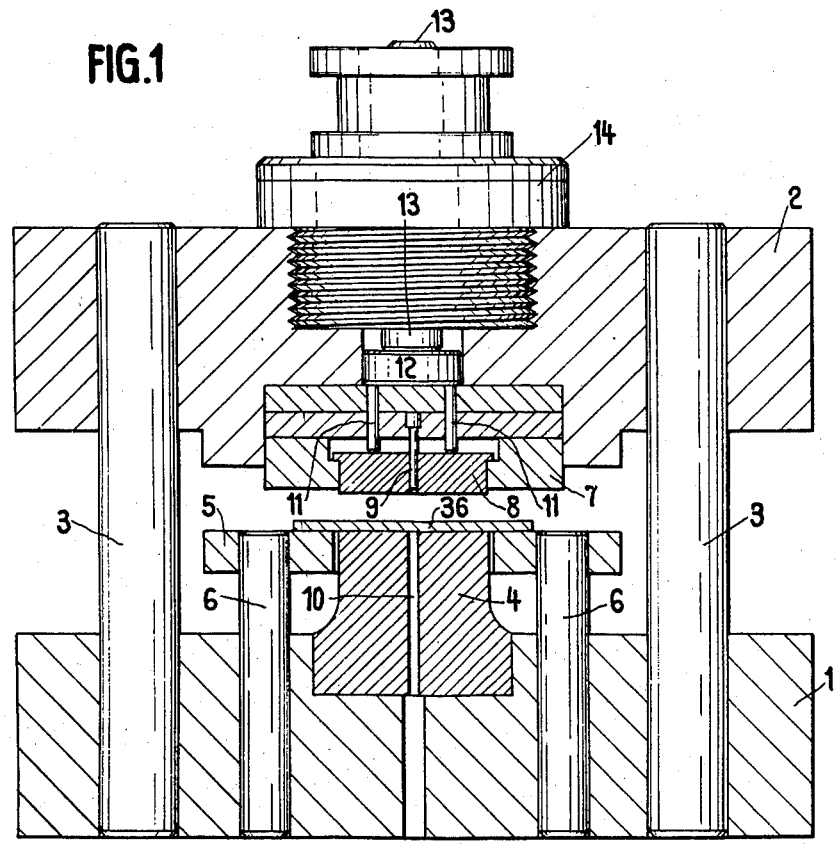
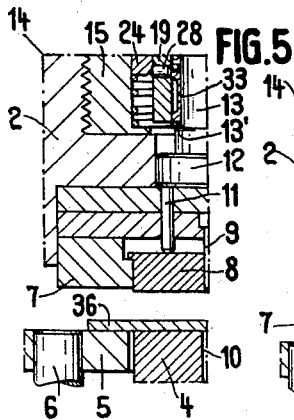 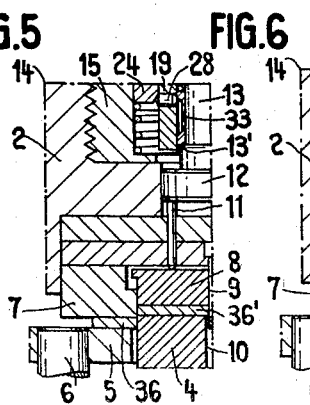 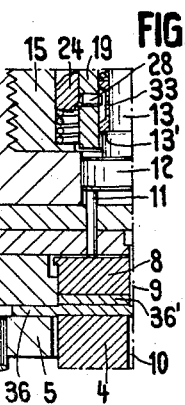
INVENTOR.
René Chevallier
BY INVENTOR.
René Chevallier

United States Patent Office 2,970,503
Patented Feb. 7, 1961

2,970,503

PUNCH TOOL DRIVE MEANS YIELDABLE UPON UNDUE THICKNESS OF MATERIAL BEING PUNCHED

René Chevallier, Ville-la-Grand, France, assignor to Ebauches S.A., Neuchatel, Switzerland Filed Feb. 26, 1957, Ser. No. 642,558

Claims priority, application Switzerland Mar. 2, 1956

7 Claims. (Cl. 83—61)

This invention relates to a protecting device for a punching or stamping tool consisting for instance of a punch and a die or matrice, the said tool having a part driven by a press ram and a fixed part.

Punching and stamping tools, particularly cutting tools are liable to be heavily damaged when the thickness of the workpiece, for instance a sheet from which the desired pieces are to be punched, exceeds its normal thickness. Heavy damages may also occur when the punched articles are not properly ejected or separated from the tool in which case a double thickness of the material inserted into the punching tool will occur. By the enormously increased pressures which may occur in the tool particularly when a previously punched article was not properly removed from the tool, the tool and particularly thin punching pins of the same may be broken. Such a damage of the punching tool not only means the loss of the tool but also a heavy loss of working time of the tool and of the machine and therefore a loss of production.

It is the main object of this invention to provide a protecting device for punching and stamping tools, this protecting device being able to practically avoid heavy damage of the tool and of the press due to extreme thickness of the workpiece. The protecting device according to this invention is broadly characterized in that the one part of the tool is connected to the press by means of a coupling comprising coupling means operatively connected with control means of the tool, for breaking the closed linkage in the coupling when the thickness of the workpiece exceeds its normal value. In punching tools having an ejector the coupling may preferably be controlled by the ejector of the tool.

The drawing illustrates, by way of example, an embodiment of the protecting device according to this invention for use with a punching tool.

Figure 3:
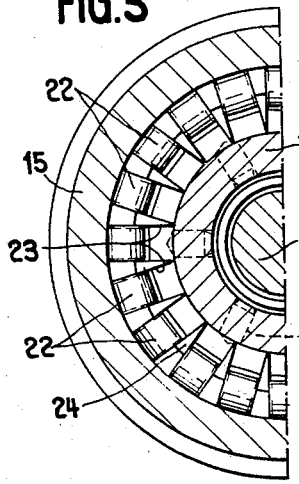
Figure 4:
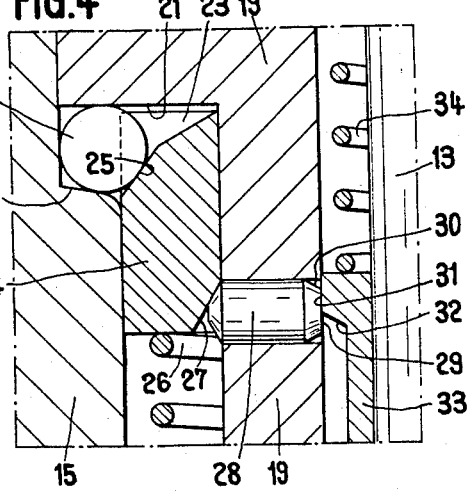

Fig. 1 is an axial section of the punching tool, the coupling being shown in elevation, Fig. 2 is an axial section of the coupling on a larger scale, Fig. 3 is a section along the line III—III in Fig. 2, Fig. 4 shows a part of the section of Fig. 2 on a larger scale and Figs. 5 to 7 are portions of the section of Fig. 2 on a smaller scale illustrating different typical operating positions of the protecting device.

The illustrated punching tool is of conventional construction and has a lower part or die 1 fixed on a worktable of a suitable press, and an upper part or die 2 slidably guided on columns 3 inserted into the lower part 1. The lower part 1 carries the punch or stamp 4 of the punching tool. The punch 4 is surrounded by a stripping plate 5 slidably guided in the lower part 1 by means of columns 6 and which may be pressed downwardly from the illustrated position against the action of one or more suitable springs not shown, in a manner well known in the art. A pressure spring may for instance act from below onto a pressure plate applying against the lower surface of the part 1 and against the columns 6 respectively thereby urging the stripping plate 5 into the position illustrated but allowing downward motion of the plate 5 against the action of the pressure spring not shown.

A matrice 7 is inserted into the upper part 2 of the tool, the matrice 7 having an ejector plate 8. The matrice 7 may be equipped with one or more punching pins. One cylindrical punching pin 9 is illustrated by way of example, the punch 4 of the tool having a corresponding cylindrical bore 10 opposite the punching pin 9. Through columns 11 and a transmitting disc 12 the ejector plate 8 is operatively connected with an ejector 13. The ejector 13 which may be brought into its operating position illustrated by means of a spring for smaller tools or by means of a positive eccentric drive for larger tools passes through a coupling 14 screw fastened to the upper part 2 of the tool and connected with its upper end to the ram (not shown) of a press.

As will be seen from the enlarged sectional views of Figs. 2 to 4 the coupling 14 has a part 15 screwed to the upper part 2 of the tool, the part 15 being screwed to a ring 16. A ring-shaped groove or recess 17 is formed in the upper portion of the common bore of parts 15 and 16, this groove being engaged by a flange 18 of the part 19 of the coupling connected to the press ram. The axial extension of the flange 19 is smaller than that of the groove 17 so that the part 19 may axially be displaced in the parts 15 and 16 of the coupling. The part 19 may also be axially displaced relatively to the ejector 13. Below the annular groove 17 and the annular flange 18 respectively the parts 15 and 19 have shoulders 20 and 21 respectively. A rim of pressure transmitting coupling rollers 22 is inserted between shoulders 20 and 21. While the shoulder 21 is plane the shoulder 20 is slightly inclined inwardly in such a way that the coupling rollers 22 tend to move inwardly on the shoulder 20 when an axial pressure is transmitted between parts 19 and 15. Each of the coupling rollers 22 is held in a recess 23 of a ring 24. The supporting surfaces 25 for the rollers 22, formed in the recesses 23 are so inclined that the coupling rollers tend to shift the ring 24 downwardly when tending to move inwardly under the action of a pressure transmitted between parts 19 and 15. Normally the ring 24 is held in the upper rest position shown in Figs. 2 to 4 of the drawing, in which rest position the ring 24 keeps the coupling rollers 22 in their outer position as illustrated in Figs. 2 and 3, in which outer position the rollers 22 contact the wall of the bore of part 15.

At its lower end the ring 24 has an inner conical face 27 contacting conical outer control faces of locking bolts 28 axially displaceably inserted into radial bores of the part 19. At their inner end the locking bolts 28 have each a flat control face 29 and a small conical face 30. The flat control face 29 and the conical face 30 of the locking bolts 28 are adapted for cooperation with a cylindrical control face 31 and a conical control face 32 respectively of a locking sleeve 33. Normally the locking sleeve 33 is held in its lower end position illustrated in Figs. 2, 4 and 5 by a pressure spring 34, in which end position the sleeve 33 abuts against a stop screw 35. Below the locking sleeve 33 the ejector 13 has a shoulder 13' adapted to carry the locking sleeve upwardly when the ejector is displaced upwardly by such an amount that the shoulder 13' engages the sleeve 33.

The illustrated protecting device operates as follows:

When the upper part 2 of the punching tool is in its upper position shown in Fig. 1 a sheet material, for instance a metal sheet 36 from which the desired article is to be punched is inserted between the punch 4 and the matrice 7 of the tool, whereafter the press is operated. Thereby the press ram with the coupling part 19 fixedly attached to it and the upper tool part 2 with the matrice 7 are moved downwardly whereby the ejector plate 8 first contacts the sheet material 36 and is pressed into the matrice 7 until it becomes flush with the same when the lower surface of the matrice 7 and its punching pin 9 contact the sheet material 36. By further downward motion of the tool part 2 and the matrice 7 cutting of the tool begins whereby the punched or cut part 36' (Fig. 6) is pressed into the matrice 7 by the punch 4 and the ejector plate 8 is further pressed into the matrice 7. During the cutting operation the sheet material surrounding the punch 4 is pressed downwardly by the matrice surface so that the stripping plate 5 is pressed downwardly against spring action in the manner described above. In this manner the tool reaches its end position of the normal working stroke for which the punched part 36' is completely cut out and is pressed into the matrice 7.

The working stroke and the working pressure are transmitted from the ram of the press through part 19 of the coupling attached thereto, the coupling rollers 22 to the part 15 of the coupling and from there to the upper part 2 of the tool and to the matrice 7. As may be seen from Figs. 2 and 4 the pressure is transmitted by closed linkage because the coupling rollers 22 cannot possibly leave their position illustrated in Figs. 2 to 4, the reason being that the locking bolts 28 applying with their plane faces 29 against the cylindrical face 31 of the locking sleeve 33 cannot move inwardly and therefore any downward motion of the ring 24 is impossible. The ring 24 which is thereby locked in its upper end position prevents lateral movement of the coupling rollers 22 so that the coupling will transmit any desired pressure unless parts of it, for instance the rollers 22 will break. However, as shown in Fig. 6, the ejector plate 8, the columns 11, the disc 12 and the ejector 13 are lifted relatively to the matrice and to the coupling part 19 during each normal punching operation, whereby the shoulder 13' of the ejector abuts against the locking sleeve 33 and lifts the locking sleeve by such an amount that the plane faces 29 of the locking bolts 28 are still carried by the cylindrical face 31 of the locking sleeve 33.

After the above described normal punching operation the press ram and consequently the coupling portion 19 attached thereto are moved upwardly whereby the flange 18 lifts the part 16 and the parts 15, 2 and 7 rigidly connected to the same. In a well known manner the punched part 36' is ejected from the matrice by the ejector plate 8 and normally is immediately removed from the tool. The punchings of the sheet material 36 are stripped off the punch 4 by the stripping plate 5 and are immediately removed from the tool or advanced in a well known manner for punching the next part.

If, for another punching operation two layers of the sheet material 36 are inserted between the tool parts 1 and 2 or when the part produced by a previous punching operation was not properly removed from the tool, a situation that may particularly occur with fully automatic machine operation in spite of normal operation of the ejector when the thin punching pin 9 has been broken, the closed linkage in the coupling 14 is broken in the manner illustrated in Fig. 7. As set out above the locking sleeve 33 is lifted relatively to the part 19 during every normal punching operation to such an extent that the locking sleeve is just able to support the locking bolts 28. At any further upward motion the locking sleeve 33 would release the locking bolts 28. This will occur when a previously produced punched part 36' remains in the matrice 7 as shown in Fig. 7, because at a new punching operation the punched part 36' and consequently the ejector plate 8 are further pressed upwardly into the matrice 7 by the new material of the inserted sheet 36 pressed into the matrice by the punch (compare the position of the ejector plate in the matrice at the end of the normal punching operation as shown in Fig. 6 and shortly after the beginning of the next punching operation with double thickness of the material as shown in Fig. 7). The aforementioned further upward motion of the ejector plate 8 is transmitted through columns 11, disc 12 and ejector 13 to the locking sleeve 33 of the coupling whereby the locking sleeve 33 is further lifted relatively to the part 19 and will soon reach a position for which its cylindrical face 31 has left the plane faces of the locking bolts 28. Therefore the locking bolts 28 are able to move inwardly and they will immediately be pushed inwardly by the conical face 27 of the ring 24 due to a downward pressure component exceeding the pressure of spring 26 acting on the ring 24 from the inward pressure of the coupling rollers 22. Thereby the conical control faces 30 of the locking bolts 28 will engage the conical control face 32 of the locking sleeve 33 so that the locking sleeve is further moved upwardly. The inward displacement of the locking bolts 28 allows free downward passage of the ring 24 in front of the locking bolts 28 and the ring 24 is immediately pressed down under the action of the coupling rollers 22. Therefore the coupling rollers 22 are themselves able to move inwardly and will therefore leave the inclined shoulder 20 of the coupling part 15 and will enter into the ring space between parts 15 and 19 in which ring space they will stay above the displaced ring 24. Thereby the closed linkage normally constituted between coupling parts 19 and 15 by the coupling rollers 22 is broken and the coupling part 19 attached to the press ram will freely move down into its lower end position relatively to the coupling part 15 without transmitting any appreciable force to the coupling part 15 and to the tool attached thereto. During this relative motion of the parts 19 and 15 the flange 18 of part 19 slides downwardly in the groove 17 of parts 15 and 16 but does not abut against the lower shoulder limiting the groove 17. As may be seen from Fig. 7 the maximum downward stroke of the matrice 7 is so designed that the ejector plate 8 does not yet contact the ground of the recess of the matrice. Therefore a situation is impossible for which the ejector plate 8 is completely pressed into the recess of the matrice 7 when further downward motion of the upper part 2 of the tool is still possible. Consequently it is impossible that extremely high stresses damaging the tool may occur at any time. The above described coupling inserted between the press ram and the upper tool part thus provides for reliable protection of the tool against damage when the thickness of the material to be punched exceeds its normal value. Therefore damages of the very expensive tools or of the machine and loss of production caused thereby may be avoided by means of the protecting device according to this invention.

During the following upward stroke of the coupling part 19 the ring 24 and the coupling rollers 22 will follow the upward motion of the part 19 relatively to the part 15 under the action of pressure spring 26 and the coupling rollers 22 are pressed into the coupling position illustrated by the rest faces 25 of ring 24. As soon as the ring 24 leaves the locking bolts 28 the latter are pressed outwardly into the position illustrated in Figs. 2 to 6 by the conical control face 32 of the locking sleeve 33 which is pressed downwardly by the pressure spring 34. The coupling is again engaged and is ready for another breaking of the closed linkage between the press ram and the upper tool part when the cause for such a breaking continues.

In couplings for transmitting relatively low pressures for small tools the coupling rollers 22 may directly act on locking bolts 28 situated in the same radial plane as the coupling rollers 22 and having a stroke corresponding to the necessary radial displacement of the coupling rollers 22 for disengaging the coupling. In such a coupling the supporting ring 24 and the spring 26 may be omitted.

In the device shown in the drawings and described in the foregoing specification the matrice with the ejector serving as a control member for the coupling is the driven part of the tool. However, the arrangement may be reversed whereby the normally stationary matrice is supported on a fixed machine part, for instance on the worktable of a press, by means of a coupling similar to the one shown in the drawings. Operation of such a device is analogous to the one described in that the coupling would allow movement of the matrice under the pressure of the driven punch when the thickness of the workpiece exceeds its normal value.

Of course the coupling and its control members may be so designed that the locking sleeve 33 would not be displaced for normal punching operations but only when the thickness of the workpiece exceeds its normal value, whereby any displacement of the locking sleeve would cause disengagement of the coupling.

Since every disengagement of the coupling indicates an abnormal condition it may be desired to stop the press immediately after the first disengagement of the coupling or to actuate at least some signal or alarm. This may be done in a very simple manner for instance by the provision of an electrical contact between coupling parts 19 and 15, this contact being open when the coupling is engaged and closed when the coupling is disengaged, whereby the machine would be stopped or a signal or alarm actuated on closure of the contact.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

What I claim is:

1. A protecting device for a punching or stamping tool, comprising in combination two relatively displaceable tool portions attached to relatively displaceable parts of a press, one of the said tool portions comprising an ejector displaceable in the said one tool portion, a mounting part in the said one tool portion adapted for attachment to one of the said press parts and a working part separate from the said mounting part, annular pressure transmitting surfaces on the said mounting part and on the said working part, pressure transmitting rollers between such pressure transmitting surfaces, a pressure transmitting direction substantially perpendicular to the said pressure transmitting surfaces, at least one of the said pressure transmitting surfaces having an inclination relatively to a plane perpendicular to the said pressure transmitting direction so that the said rollers tend to leave the said pressure transmitting surfaces when pressure is transmitted, an axially displaceable locking ring comprising a locking surface engaging the said pressure transmitting rollers and having an inclination relatively to the displacing direction of the rollers between the said pressure transmitting surfaces, a locking position and an unlocked position for the said locking ring and spring means for maintaining the said locking ring in its locking position, locking bolts adapted to maintain the said locking ring in its locking position, a control sleeve displaceable with the said ejector in operative engagement with the said locking bolts, a normal position for the said control sleeve for which it engages and supports the said locking bolts and a safety position to which the said control sleeve is displaced on occurrence of an overthickness of the workpiece and in which safety position the control sleeve leaves and releases the said locking bolts, perpendicular displacing directions for the said locking ring and locking bolts respectively and control surfaces on the locking ring and locking bolts respectively, such control surfaces engaging each other and being inclined relatively to the said displacing directions of the locking ring and locking bolts, the said rollers, the said locking ring and the said locking bolts being displaced by pressure transmission from the said rollers through the said locking surface of the locking ring and the said control surfaces of the locking ring and locking bolts respectively when the said control sleeve releases the said locking bolts, whereby pressure transmission between the pressure transmitting surfaces of the said mounting part and working part respectively is broken due to displacement of the said pressure transmitting rollers off the said pressure transmitting surfaces, but the said pressure transmitting rollers being maintaned in pressure transmitting position between the said pressure transmitting surfaces when displacement of the said rollers the said locking ring and the said locking bolts is prevented by the said control sleeve.

2. A protecting device according to claim 1, the said mounting part being connected to the press ram of the said press.

3. A protecting device according to claim 1, the said mounting part being connected to a stationary part of the press.

4. A protecting device for a punching or stamping tool, comprising in combination two relatively displaceable tool portions attached to relatively displaceable parts of a press, one of the said tool portions comprising a feeler displaceable in the said one tool portion, a mounting part in the said one tool portion adapted for attachment to one of the said press parts and a working part separate from the said mounting part, pressure transmitting surfaces on the said mounting part and on the said working part respectively, pressure transmitting elements between such pressure transmitting surfaces, a pressure transmitting direction substantially perpendicular to the said pressure transmitting surfaces, a pressure transmitting coupling between the said mounting part and the said working part being formed by the said pressure transmitting surfaces and pressure transmitting elements respectively, at least one of the said pressure transmitting surfaces having an inclination relatively to a plane perpendicular to the said pressure transmitting direction so that the said pressure transmitting elements tend to leave the pressure transmitting surfaces when pressure is transmitted, an engaged condition of the said coupling, when the said elements are maintained between the said pressure transmitting surfaces and a disengaged condition of the said coupling when the said elements have left the pressure transmitting surfaces, locking means cammed radially outwardly, such locking means being operably associated with and adapted to be displaced by the said pressure transmitting elements, a control member displaceable by the said feeler and operatively associated with the said locking means, a normal condition of the said feeler and control member respectively when working pieces of normal thickness, the said control member engaging the said locking means when in its normal condition thereby preventing displacement of the said locking means and pressure transmitting elements between the said pressure transmitting surfaces so that the said coupling is in its engaged condition for transmitting any pressure between the said mounting part and working part respectively, and an emergency condition for the said feeler and control member respectively when a piece having excessive thickness is worked, for which emergency condition the control member releases the said locking means and allows displacement of the said locking means and pressure transmitting elements respectively, the pressure transmitting elements being thereby allowed to leave the said pressure transmitting surfaces so that the said coupling is disengaged thereby preventing pressure transmission from the said mounting part to the said working part.

5. A protecting device according to claim 4, the said feeler and control member respectively being axially displaceable in the center of the said mounting part and working part respectively, a shoulder in a recess of the said working part forming a pressure transmitting surface and a shoulder on a portion of the said mounting part entering the said recess forming another pressure transmitting surface, the said pressure transmitting elements being adapted for radial inward displacement between such shoulders.

6. A self-protected tool portion, comprising a mounting part adapted for attachment to a portion of a ram press and a working part separate from the said mounting part, a feeler displaceable in the said tool portion, pressure-transmitting coupling means between the said mounting part and the said working part, pressure transmitting elements in the said coupling means and locking means for such elements, a control member displaceable by the said feeler, an engaged condition and a disengaged condition for the said coupling means, the said pressure transmitting elements being in an engaged or disengaged position according to whether the said coupling is in its engaged or disengaged condition, means tending to displace the said elements to their disengaged position, a normal condition for the said feeler, control member and locking means respectively when working pieces of normal thickness, cam means of the said locking means engaging the pressure transmitting elements, the said pressure transmitting elements being locked in their engaged position by the said cam means when the said control member and locking means respectively are in normal condition, and an emergency condition for the said control member and locking means respectively when working pieces having excessive thickness, the said pressure transmitting elements being released by the said cam means to their disengaged position and the coupling being in disengaged condition when the said control member and locking means are in emergency condition.

7. A self-protected tool portion, comprising a mounting part adapted for attachment to a ram press and a working part separate from the said mounting part, a feeler displaceable in the said tool portion, pressure-transmitting coupling means between the said mounting part and the said working part, pressure transmitting elements in the said coupling means, an engaged and a disengaged position of the said pressure transmitting elements, the coupling means being in engaged or disengaged condition according to whether the said pressure transmitting elements are in engaged or disengaged position, cam means under control of the said feeler operatively engaging the said pressure transmitting elements, a locking position of the said cam means for which the pressure transmitting elements are locked in engaged position by the cam means and a release position of the said cam means for which the pressure transmitting elements are released from engaged position to disengaged position, means tending to displace the said pressure transmitting elements from engaged to disengaged position when pressure is transmitted through the said coupling and means tending to maintain the said cam means in locking position, the said cam means being adapted to shift the said pressure transmitting elements from disengaged to engaged position when displaced from the said release position to the said locking position, a normal condition for the said feeler and cam means respectively when working pieces of normal thickness, the said cam means being in locking position during normal condition thereby supporting the pressure transmitting elements in engaged position, and an emergency condition of the said feeler and cam means during the working stroke of the tool portion when working pieces having excessive thickness, the said cam means being displaced to release position during this emergency condition thereby allowing displacement of the pressure transmitting elements to disengaged position, and a reset condition during the return stroke of the tool portion wherein the said cam means are returned to locking position by the said means tending to maintain the cam means in locking position and the said pressure transmitting means are returned to engaged position by the said cam means whereby the coupling is reengaged for the next working stroke.

References Cited in the file of this patent

UNITED STATES PATENTS

| | | |
|---|---|---|
| 928,256 | Grissom | July 20, 1909 |
| 1,138,374 | Graffenberger | May 4, 1915 |
| 1,308,775 | Day | July 8, 1919 |
| 2,485,009 | Muller | Oct. 18, 1949 |
| 2,589,849 | Oetiker | Mar. 18, 1952 |
| 2,690,918 | Holte | Oct. 5, 1954 |
| 2,856,999 | Wilhelm | Oct. 21, 1958 |